United States Patent
Ichinose et al.

(10) Patent No.: US 7,637,315 B2
(45) Date of Patent: Dec. 29, 2009

(54) CONSTANT TEMPERATURE LIQUID CIRCULATING DEVICE AND METHOD OF CONTROLLING TEMPERATURE IN THE DEVICE

(75) Inventors: Takeo Ichinose, Tsukubamirai (JP); Katsutoshi Sato, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 343 days.

(21) Appl. No.: 11/521,464

(22) Filed: Sep. 15, 2006

(65) Prior Publication Data

US 2007/0074863 A1    Apr. 5, 2007

(30) Foreign Application Priority Data

Sep. 30, 2005    (JP)    ............................. 2005-288600

(51) Int. Cl.
*G05D 23/00*    (2006.01)
(52) U.S. Cl. ...................... 165/295; 165/243; 165/289; 62/201
(58) Field of Classification Search ................ 165/243, 165/247, 280, 283, 289, 295; 62/185, 201; 374/3, 30, 33, 39–40
See application file for complete search history.

(56) References Cited

U.S. PATENT DOCUMENTS 6,629,423 B1 * 10/2003 Hirooka et al. ............... 62/208
2003/0139894 A1 * 7/2003 Ryan et al. .................. 702/132

FOREIGN PATENT DOCUMENTS

| JP | 9-325821 | 12/1997 |
| JP | 2000-257800 | 9/2000 |
| JP | 2000257800 | * 9/2000 |
| JP | 2002-198315 | 7/2002 |

* cited by examiner

*Primary Examiner*—Ljiljana (Lil) V Ciric
(74) *Attorney, Agent, or Firm*—Oblon, Spivak, McClelland, Maier & Neustadt, L.L.P

(57) ABSTRACT

In a constant temperature liquid circulating device that connects a piping of circulating liquid in an external device between a discharge port and a return port of a conduit for delivering the circulating liquid at a constant temperature by a pump, a flow amount sensor and temperature sensors for detecting discharge temperature ($T_1$) of the circulating liquid from the conduit and the return temperature ($T_2$) of the circulating liquid are provided in the conduit, so that the flow amount and the temperature of the circulating liquid is controlled by a controller according to the heat load of the external device obtained on the basis of the outputs from the temperature sensors.

6 Claims, 3 Drawing Sheets

CONSTANT TEMPERATURE LIQUID CIRCULATING DEVICE AND METHOD OF CONTROLLING TEMPERATURE IN THE DEVICE

TECHNICAL FIELD

The present invention relates to a constant temperature liquid circulating device in which a stable performance is obtained in an external device by reducing the width of variation in temperature of circulating liquid in association with variation in heat load of the external device to be controlled in temperature and a method of controlling the temperature in this device.

BACKGROUND ART

A constant temperature liquid circulating device including a conduit for delivering circulating liquid controlled to a constant temperature with a pump, wherein both ends of a piping that defines a flow channel for the circulating liquid in an exterior device to be controlled in temperature are connected to a discharge port and a return port of the conduit, respectively, is generally known as disclosed, for example, in Patent Document 1 and so on.

FIG. 6 is an explanatory drawing showing a configuration of an example. A constant temperature liquid circulating device 40 in FIG. 6 includes a tank 41 for storing temperature controlling liquid, a conduit 42 having a discharge port 42a and a return port 42b for allowing the temperature controlling liquid in the tank 41 and circulating liquid at a constant temperature, which is heat-exchanged via a heat exchanger 43, to pass through a piping 51 of an external device 50, and a pump 44 provided in the conduit 42 for delivering the constant temperature circulating liquid to the piping 51 of the external device 50, wherein temperature sensors 46, 47 for detecting the temperatures ($T_1$, $T_2$) of the circulating liquid are provided at the discharge port 42a and the return port 42b of the conduit 42 so that a controller 48 for monitoring the temperature thereof controls the temperature of the circulating liquid.

In such a constant temperature liquid circulating device 40, as a method of controlling temperature in the related art for controlling the discharge temperature ($T_1$) of the circulating liquid at the discharge port 42a of the conduit 42 at a preset temperature, there is a method in which the flow amount of the circulating liquid is kept constant, the circulating liquid is cooled/heated in the heat exchanger 43 in the tank 41 by an amount corresponding to the return temperature ($T_2$) of the circulating liquid raised/lowered by the variations in heat load of the external device 50, so that the discharge temperature ($T_1$) is controlled to be the preset temperature.

In this case, it is desired for the external device 50 to reduce the variation in temperature between the exit and entrance of the circulating liquid in the piping 51 ($\Delta T$) to stabilize the temperature of the external device itself. However, since the flow amount is constant, the return temperature ($T_2$) varies significantly according to the heat load as shown in FIG. 7, and hence the temperature change between the exit and entrance ($\Delta T$) varies significantly in accordance with the variation of the heat load. Consequently, the temperature of the external device itself also varies significantly in the nature of things.

On the other hand, it is desired for the constant temperature liquid circulating device 40 to reduce variations in return temperature ($T_2$) of the circulating liquid and stabilize the temperature in the tank 41 so that the discharge temperature ($T_1$) is stabilized. However, in fact, the return temperature ($T_2$) is changed by the heat load significantly as described above and hence the fluctuation in the discharge temperature ($T_1$) is increased as shown in FIG. 7, whereby it takes time until it is stabilized.

In the constant temperature liquid circulating device 40 in FIG. 6, in the method of controlling temperature in the related art in which the return temperature ($T_2$) of the circulating liquid in the return port 42b of the conduit 42 is controlled by the preset temperature, it is desired to keep the flow amount of the circulating liquid constant and cool/heat the circulating liquid in the heat exchanger 43 by an amount corresponding to the return temperature ($T_2$) of the circulating liquid raised/lowered by the variations in heat load of the external device 50, so that the return temperature ($T_2$) is controlled to be the preset temperature.

In this case, it is desired for the external device 50 to reduce the variation in temperature between the exit and entrance of the circulating liquid ($\Delta T$) as described above and stabilize the temperature of the external device itself. However, since the flow amount is constant, the return temperature ($T_2$) is significantly changed according to the heat load, and then, in order to keep the return temperature ($T_2$) constant, the width of lowering/rising of the discharge temperature ($T_1$) must be increased. Consequently, the variation in temperature between the exit and entrance ($\Delta T$) is increased as shown in FIG. 8.

On the other hand, it is desired for the constant temperature circulating device 40 to minimize the width of lowering/rising of the discharge temperature ($T_1$) for controlling the return temperature ($T_2$) of the circulating liquid is minimized. However, as described above, since the fluctuation in the return temperature ($T_2$) when the load is varied is increased (see FIG. 8), the width of lowering/rising of the discharge temperature ($T_1$) for keeping the return temperature ($T_2$) constant must be increased and, in addition, it takes time for stabilizing the return temperature ($T_2$).

Since all the circulating liquid in the tank 41 is lowered/raised within a wide temperature width, excessive energy is required.

Japanese Unexamined Patent Application Publication No. 9-325821

DISCLOSURE OF THE INVENTION

A technical subject of the present invention is, in the above-described constant temperature liquid circulating device, to provide a constant temperature liquid circulating device in which the flow amount of circulating liquid as well as the temperature thereof is varied according to a heat load of an external device, whereby the width of variation in temperature of the circulating liquid by variation in heat load is minimized, and the property of the external device is stabilized, and a method of controlling temperature in this device.

Another technical subject of the present invention is to provide the constant temperature circulating device for improving response with respect to the variation in temperature of the circulating liquid to improve temperature stability and the method of controlling temperature in the same device.

Another technical subject of the present invention is to provide the constant temperature circulating device in which the amount of variation in cooling and heating of the temperature controlling liquid and the circulating liquid in the constant temperature liquid circulating device is reduced so as to achieve energy saving, and the method of controlling temperature in the same device.

In order to solve the above-described subject, the present invention provides a constant temperature liquid circulating device having a conduit for delivering temperature-controlled circulating liquid at a constant temperature and a circulating flow channel formed by connecting both ends of a piping that defines a flow channel of the circulating liquid in the external device whose temperature is controlled by the circulating liquid respectively to a discharge port and a return port of the conduit for allowing the circulating liquid to circulate therein including: a flow amount sensor provided in the conduit and temperature sensors for detecting a discharge temperature ($T_1$) of the circulating liquid from the conduit and a return temperature ($T_2$) of the circulating liquid returned to the conduit provided, characterized in that a controller for controlling the flow amount and the temperature of the circulating liquid according to a heat load of the external device obtained on the basis of the outputs from the sensors is provided with a function to control the temperature of the circulating liquid corresponding to the heat load when the temperature difference between the discharge temperature and the return temperature is smaller than the preset value, and to increase the flow amount or the pressure of the circulating liquid to the heat load portion of the piping of the external device corresponding to the heat load when the temperature difference exceeds the preset value.

In the preferred embodiment of the constant temperature liquid circulating device according to the present invention, the controller performs control such that the heat load of the external device is calculated from the temperature difference between the discharge and return temperatures ($T_1$, $T_2$) of the circulating liquid detected by the temperature sensors and the flow amount of the circulating liquid detected by the flow rate sensor, and when the heat load is larger than a certain preset value, the flow amount or the pressure of the circulating liquid to the heat load portion in the piping of the external device is increased according to the pressure difference or the heat load.

In another preferred embodiment of the constant temperature liquid circulating device according to the present invention, a function to control the circulating liquid to be delivered to the circulating flow channel by controlling the number of rotations of the pump by an inverter is provided as a control function of the controller to control the flow amount or the pressure of the circulating liquid.

It is also possible to provide a bypass flow channel for communicating the discharge port and the return port of the conduit and provide an electric valve in the bypass flow channel for adjusting the flow amount of the liquid flowing therein, thereby controlling the flow amount of the circulating liquid flowing in the heat load portion of the external device, so that a function to control the flow amount of the liquid flowing in the bypass flow channel by controlling the electric valve can be provided to the controller as a function to control the flow amount or the pressure of the circulating liquid. In this case, the electric valve may be an electric three-direction valve provided at a branch point between a piping extending to the heat load portion of the external device and the bypass flow channel at a discharge port of a conduit of the constant temperature liquid circulating device.

Furthermore, an electric proportional valve is provided at the discharge port of the conduit in the constant temperature liquid circulating device for controlling the flow amount of the circulating liquid flowing therethrough into the piping of the external device so that a function to control the liquid flowing in the piping of the external device by controlling the electric proportional valve can be provided to the controller as a function to control the flow amount or the pressure of the circulating liquid.

A method of controlling the temperature according to the present invention for solving the above-described problem is a temperature control method in a constant temperature liquid circulating device having a conduit for delivering temperature-controlled circulating liquid at a constant temperature and a circulating flow channel formed by connecting both ends of a piping that defines a flow channel of the circulating liquid in the external device whose temperature is controlled by the circulating liquid respectively to a discharge port and a return port of the conduit for allowing the circulating liquid to circulate therein having: a flow amount sensor provided in the conduit and temperature sensors for detecting a discharge temperature ($T_1$) of the circulating liquid from the conduit and a return temperature ($T_2$) of the circulating liquid returned to the conduit including: calculating a heat load of the external device from the temperature difference between the discharge and return temperature ($T_1$, $T_2$) of the circulating liquid detected by the both temperature sensors and the flow amount of circulating liquid detected by the flow amount sensor, controlling the temperature of the circulating liquid corresponding to the heat load when the heat load is smaller than a certain preset value, and increasing or reducing the flow amount or the pressure of the circulating liquid to the heat load portion of the piping of the eternal device corresponding to the heat load in addition to the temperature control of the circulating liquid when the heat load is larger than the certain preset value.

In the method of controlling the temperature, controlling the temperature of the circulating liquid by the controller may be controlling the discharge temperature ($T_1$) of the circulating liquid to a preset temperature or controlling the return temperature ($T_2$) of the circulating liquid to the preset temperature.

In the method of controlling the temperature by the constant temperature liquid circulating device configured as described including: performing a composite control in which a function to vary the flow amount of the circulating liquid flowing in the external device corresponding to the heat load is added to the related art in which the heat load of the external device is controlled only with the temperature of the circulating device and, more specifically, detecting the discharge temperature ($T_1$) and the return temperature ($T_2$) of the circulating liquid by the temperature sensors provided in the conduit of the constant temperature liquid circulating device, calculating a heat load of the external device from the temperature difference between the discharge and return temperature ($T_1$, $T_2$) of the circulating liquid detected by the both temperature sensors and the flow amount of circulating liquid detected by the flow amount sensor, controlling the temperature of the circulating liquid corresponding to the heat load when the heat load is smaller than a certain preset value, and increasing or reducing the flow amount or the pressure of the circulating liquid to the heat load portion of the eternal device according to the heat load in addition to the temperature control of the circulating liquid when the heat load is larger than the certain preset value. Therefore, the variation in temperature of the circulating liquid can be reduced to a small level and the variation in temperature of the external device itself in association therewith can be reduced and stabilized.

According to the constant temperature liquid circulating device and the method of controlling the temperature with the same, since not only the temperature, but also the flow amount of the circulating liquid are varied corresponding to the heat load of the external device, the width of temperature variation of the circulating liquid due to the variation in heat load can be reduced, and the variation in temperature of the external device itself is also reduced, so that the performance is stabilized, the response with respect to the temperature variation of the circulating liquid is improved, and the stability of the temperature can be improved.

Since the amount of variation in cooling and heating of the temperature controlling liquid and the circulating liquid or the like in the constant temperature liquid circulating device is reduced, energy saving is achieved.

BEST MODE FOR CARRYING OUT THE INVENTION

Figure 1:
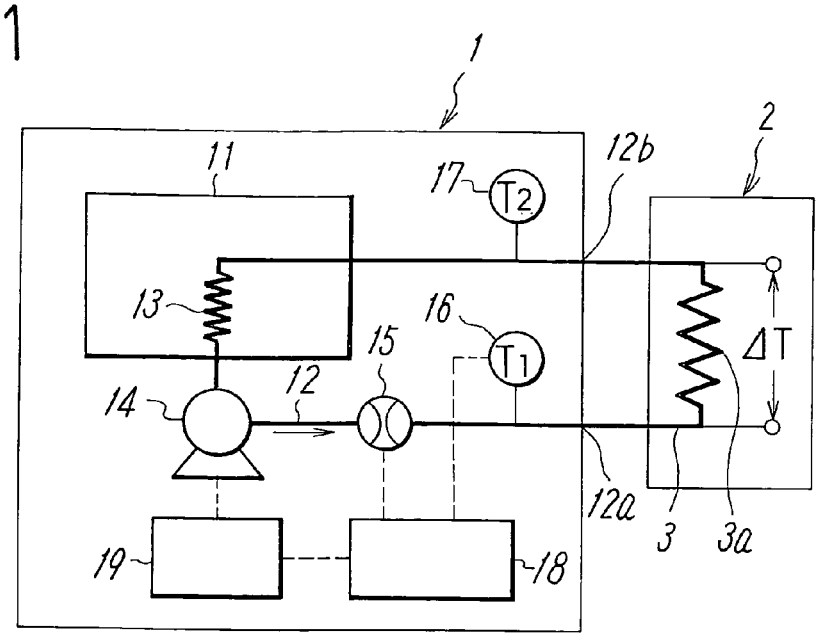
FIG. 1 is a block diagram showing a first embodiment of a constant temperature liquid circulating device according to the present invention.

Referring now to the drawings, embodiments of the present invention will be described in detail.

FIG. 1 shows a first embodiment of the constant temperature liquid circulating device according to the present invention. The constant temperature liquid circulating device 1 includes a tank 11 for storing temperature controlling liquid, a conduit 12 having a discharge port 12a and a return port 12b for circulating the temperature controlling liquid in the tank 11 and the circulating liquid at a constant temperature which is heat-exchanged via a heat exchanger 13 to pass through a piping 3 of an external device 2, and a pump 14 provided in the conduit 12 for delivering the constant temperature circulating liquid to the piping 3 of the external device 2. The above-described conduit 12 is provided with a flow amount sensor 15 provided in series with the pump 14 and temperature sensors 16, 17 for detecting the discharged and return temperatures ($T_1$, $T_2$) of the circulating liquid in the vicinity of the discharge port 12a and the return port 12b of the conduit 12, and the flow amount or the pressure, and the temperature of the circulating liquid are controlled by the controlling function of a controller 18 that monitors the flow amount and the temperature outputted from the sensors as described later.

The external device 2 includes a heat load portion 3a along the way of a piping 3 that defines a flow channel of the circulating liquid in cooperation with the conduit 12, and the user of the external device 2 connects an exit and an entrance at both ends of the piping 3 respectively to the discharge port 12a and the return port 12b to define a circulating flow channel in which the circulating liquid circulates and connects to the constant temperature liquid circulating device 1. Although the temperature sensors 16, 17 are provided with the discharge port 12a and the return port 12b in FIG. 1, the positions where the sensors 16, 17 are installed may be changed to the entrance side and the exit side of the piping 3 of the external device 2. What is essential is that the positions are close to the position of an object to be controlled in temperature.

The pump 14 is controlled in frequency (controlled in number of rotations) via an inverter 19 by the controller 18 on the basis of outputs from the flow amount sensor 15 and the temperature sensors 16, 17, and hence the flow amount or the pressure of the circulating liquid to be delivered to the circulating flow channel is controlled.

As controlling means for controlling the temperature of the constant temperature liquid in the tank 11 of the constant temperature liquid circulating device 1 at a constant temperature, or controlling means for controlling the temperature of the circulating liquid in the heat exchanger 13 which is not provided with the tank at a constant temperature, there are a water-cooled system, a freezing system, Pertier system, and so on as a cooling system, and a heater system, a hot gas system and so on as the heating system. In these systems, control is made by the controller 18.

In the controller 18 of the constant temperature liquid circulating device 1, control is performed basically as follows by its controlling function.

In the controller 18 described above, a heat load of the external device 2 is calculated in sequence from the temperature difference between the discharged and return temperatures ($T_1$, $T_2$) of the circulating liquid detected by the temperature sensors 16, 17 and the flow amount of the circulating liquid detected by the flow amount sensor 15.

When the temperature difference between the discharge and return temperatures ($T_1$, $T_2$) of the circulating liquid is increased while the constant temperature liquid circulating device 1 is in operation, and hence it is determined that the heat load exceeds a preset value set as needed by the controller 18, the temperature difference between the discharge and return temperatures ($T_1$, $T_2$) is reduced by increasing the number of rotations of the pump 14 according to the temperature difference or the heat load via the inverter 19 and increasing the flow amount of circulating liquid or the pressure to the heat load portion 3a of the piping 3 of the external device 2.

Even when the temperature difference between the discharge and return temperatures ($T_1$, $T_2$) of the circulating liquid is increased, if it is smaller than the preset value of the heat load described above, the temperature of the circulating liquid is controlled by the heat exchanger 13 corresponding to the heat load thereof without controlling the number of rotations of the pump 14 by the inverter 19. In other words, as in the related art, control is achieved in such a manner that the flow amount of the circulating liquid is kept constant, and the circulating liquid is cooled/heated in the heat exchanger 13 in the tank 11 by an amount corresponding to the discharge temperature ($T_1$) or the return temperature ($T_2$) of the circulating liquid raised/lowered by the variations in heat load of the external device 2, so that these temperatures are kept at preset temperatures.

When the increased heat load as described above is reduced, and the temperature difference between the discharge and the return temperatures ($T_1$, $T_2$) of the circulating liquid is reduced, the number of rotations of the pump 14 is reduced by the inverter 19, and the flow amount is reduced, so that the normal state is restored.

In other words, the controller 18 that controls the circulating liquid according to the heat load of the external device 2 is provided with a control function such that when the temperature difference between the discharge and the return temperatures is smaller than the preset value, the temperature of the circulating liquid is controlled corresponding to the heat load, and when the temperature difference exceeds the preset value, the flow amount or the pressure of the circulating liquid to the heat load portion 3a of the piping 3 in the external device 2 is increased corresponding to the heat load in addition to the temperature control of the circulating liquid.

In this manner, when the heat load exceeds a certain preset value set in the controller 18, not only the temperature of the circulating liquid, but also the flow amount or the pressure thereof is varied according to the heat load of the external device 2 so that the width of temperature variation of the circulating liquid due to the variation in heat load is reduced, and the variation in temperature of the external device 2 itself is also reduced, so that the performance is stabilized, the response with respect to the temperature variation of the circulating liquid is improved, and the stability of the temperature can be improved. Since the amount of variation in cooling and heating of the temperature controlling liquid, the circulating liquid and so on in the constant temperature liquid circulating device is reduced, energy saving is achieved.

The preset value regarding the above-described heat load is set depending on how much the width of temperature variation of the circulating liquid due to variations in heat load is reduced.

The temperature control of the circulating liquid by the controller 18 includes a system of controlling the discharge temperature ($T_1$) of the circulating liquid to the preset temperature and a system of controlling the return temperature ($T_2$) of the circulating liquid to the preset temperature ($T_2$).

Figure 2:
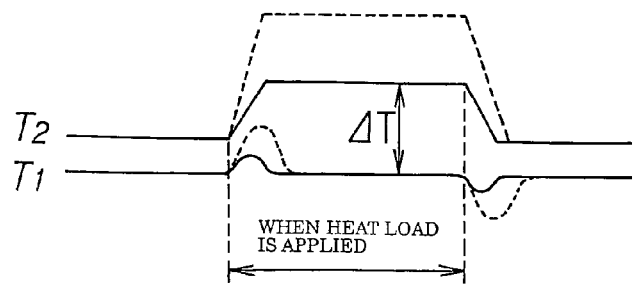
FIG. 2 is an explanatory pattern diagram for explaining a relation between variations in heat load in an external device and temperatures ($T_1$, $T_2$) at discharge and return ports of a conduit of the constant temperature liquid circulating device in a case in which the temperature ($T_1$) at the discharge port of the conduit of the constant temperature circulating liquid is controlled to a preset temperature according to the first embodiment.
Figure 7:
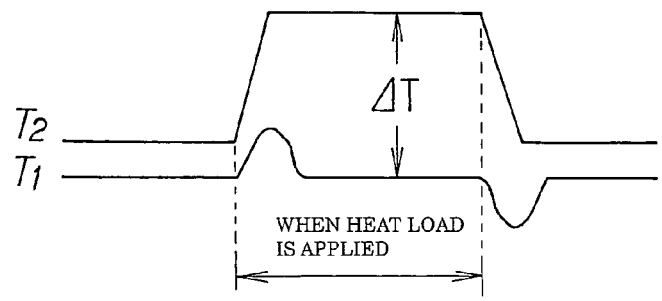
FIG. 7 is an explanatory pattern diagram for explaining a relation between variations in heat load in the external device and temperatures ($T_1$, $T_2$) at discharge and return ports of a conduit of the constant temperature liquid circulating device in a case in which the temperature ($T_1$) at the discharge port of the conduit of the constant temperature circulating liquid is controlled to the preset temperature in the device according to the related art.
Figure 8:
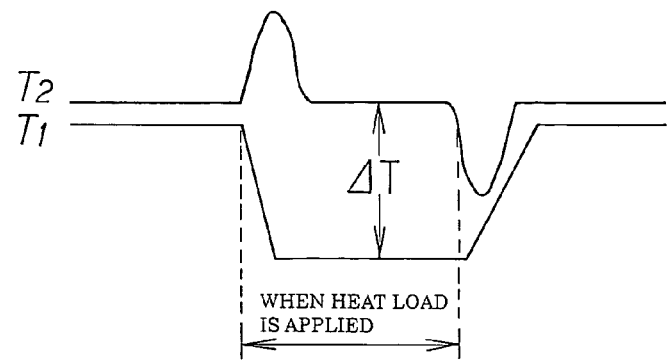
FIG. 8 is an explanatory pattern diagram for explaining the relation between the variations in heat load in the external device and the temperatures ($T_1$, $T_2$) at the discharge and return ports of the conduit of the constant temperature liquid circulating device in a case in which the temperature ($T_2$) at the return port of the conduit of the constant temperature circulating liquid is controlled to the preset temperature in the same device in FIG. 7.

When the discharge temperature ($T_1$) is controlled to the preset temperature, the control operation viewed from the standpoint of the external device 2 is such that the temperature variation ($\Delta T$) between the exit and the entrance of the piping 3 is reduced by varying the flow amount of circulating liquid by the pump 14 according to the heat load of the external device 2 (see FIG. 2). Therefore, the variation in temperature in the external device 2 is reduced to a low level and hence the stable performance is achieved. The dotted line in FIG. 2 shows a characteristic of the examples in the related art having no variation in flow amount of the circulating liquid shown in FIG. 7.

The control operation when viewed from the standpoint of the constant temperature liquid circulating device 1 is such that when the temperature variation ($\Delta T$) is reduced, variation in the return temperature (T2) is also reduced and, consequently, the temperature in the tank 11 is stabilized, the fluctuation in the discharge temperature ($T_1$) is reduced, the response is improved, and a favorable temperature stability of the discharge temperature ($T_1$) is achieved (see FIG. 2).

Figure 3:
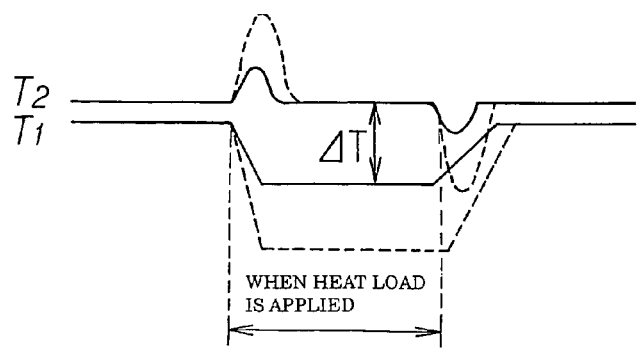
FIG. 3 is an explanatory pattern diagram for explaining the relation between the variations in heat load in the external device and the temperatures ($T_1$, $T_2$) at the discharge and return ports of the conduit of the constant temperature liquid circulating device in a case in which the temperature ($T_2$) at the return port of the conduit of the constant temperature circulating liquid is controlled to the preset temperature according to the same embodiment.

When the return temperature ($T_2$) is controlled to the preset temperature instead of the discharge temperature ($T_1$), the control operation viewed from the external device 2 is such that the flow amount of the circulating liquid is varied according to the heat load of the external device 2 so that variations in the return temperature ($T_2$) is reduced as in the case of controlling the discharge temperature ($T_1$). Accordingly, the width of lowering/rising of the discharge temperature ($T_1$) for keeping the return temperature ($T_2$) constant can be reduced, and hence the temperature variation ($\Delta T$) is reduced (see FIG. 3). Consequently, variation in temperature of the external device 2 can be reduced to a low level, and hence a stable performance is achieved.

The control operation viewed from the constant temperature liquid circulating device 1 is such that fluctuation in the return temperature ($T_2$) when the load is varied is reduced by varying the flow amount of the circulating liquid according to the heat load of the external device 2 as described above (see FIG. 3), and stabilization of the return temperature ($T_2$) is achieved quickly, whereby the response is improved.

Therefore, the width of lowering/rising of the discharge temperature ($T_1$) for keeping the return temperature ($T_2$) constant can be reduced, and the width of lowering/rising of the temperature of all the circulating liquid in the tank 11 is reduced, thereby achieving energy saving.

Figure 4:
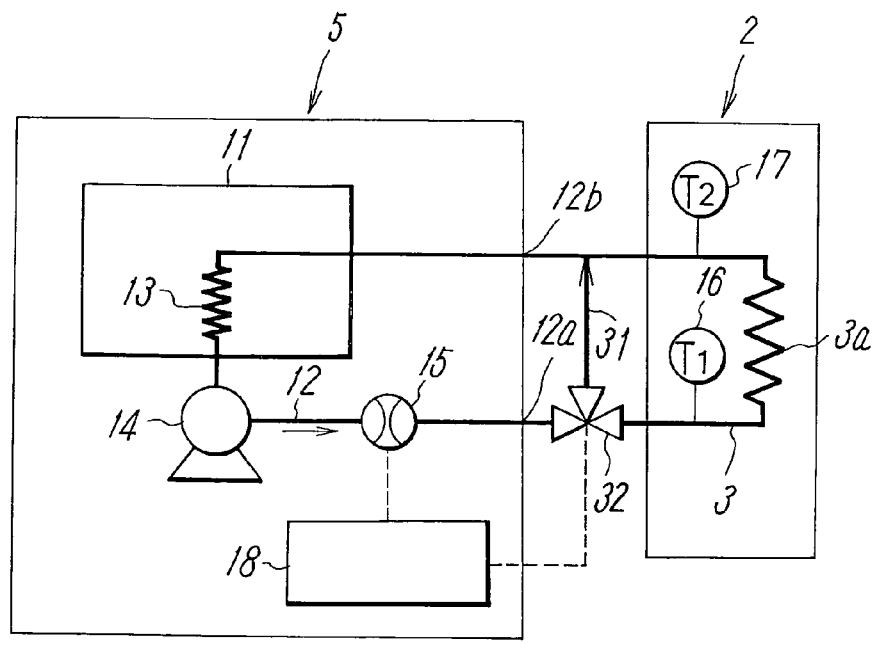
FIG. 4 is a block diagram showing a second embodiment of the constant temperature liquid circulating device according to the present invention.

Referring now to FIG. 4, a second embodiment of the constant temperature liquid circulating device according to the present invention will be described.

In the first embodiment, when providing the controller 18 with the controlling function for controlling the flow amount or the pressure of the circulating liquid to be delivered to the piping 3 of the external device 2, the number of rotations of the pump 14 is controlled by the inverter 19. In contrast to this configuration, a constant temperature liquid circulating device 5 in the second embodiment is provided with a bypass flow channel 31 for communicating the discharge port 12a and the return port 12b of the conduit 12 in the constant temperature liquid circulating device 5 with each other, and an electric valve 32 is provided in the bypass flow channel 31 for adjusting the flow amount of the liquid flowing therein from the discharge port 12a side to the return port 12b side to control the flow amount of the circulating liquid flowing in the piping 3 in the external device 2, thereby controlling the pressure in the piping 3 in the event.

The electric valve 32 may be an electric three-direction valve that can control the flow toward the piping 3 side and the flow toward the bypass flow channel 31 side in a no phased manner or in a step-by-step manner when it is provided at a branch point between the piping 3 and the bypass flow channel 31 of the external device 2 at the discharge port 12a of the conduit 12 of the constant temperature liquid circulating device 5 as shown in the drawing. It is also possible not to employ the configuration of the electric three-direction valve, and one or more electric valves 32 that can control the flow toward the piping 3 side and the flow toward the bypass flow channel 31 side may be provided on the piping 3 side or the bypass flow channel 31 side.

In the case of the second embodiment, when it is determined that the heat load of the external device 2 is increased by the controller 18 on the basis of the outputs from the temperature sensors 16, 17, the controller 18 controls the electric valve 32 to lower the flow amount of the bypass flow channel 31, whereby the flow amount to the heat load portion 3a of the piping 3 is increased.

When the heat load of the external device 2 is small, the flow amount of the bypass flow channel 31 is increased to reduce the flow amount on the heat load portion 3a side, and when the heat load is smaller than the preset value preset by the controller 18, the temperature of the circulation liquid is controlled corresponding to the heat load as in the case of the first embodiment.

When the electric valve 32 as described above is provided, the temperature sensors 16, 17 are provided on the external device 2 side with respect to junction points at the discharge port 12a and the return port 12b of the conduit 12 of the constant temperature liquid circulating device 5 with the bypass flow channel 31, and the corresponding portion is controlled.

Since other configurations and effects in the second embodiment are substantially the same as those of the first embodiment, the same or corresponding portion in the drawing are designated by the same reference numerals and description thereof are omitted.

Figure 5:
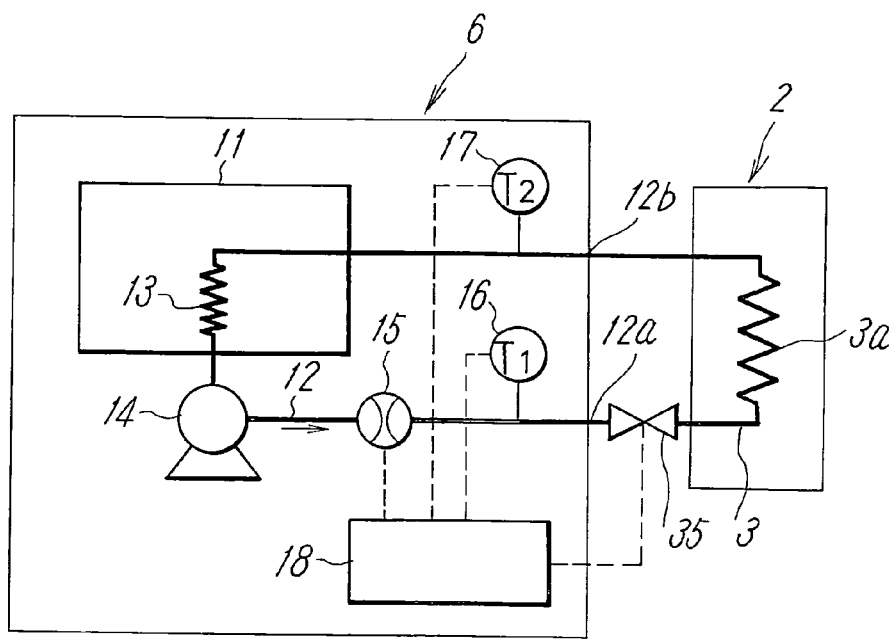
FIG. 5 is a block diagram showing a third embodiment of the constant temperature liquid circulating device according to the present invention.
Figure 6:
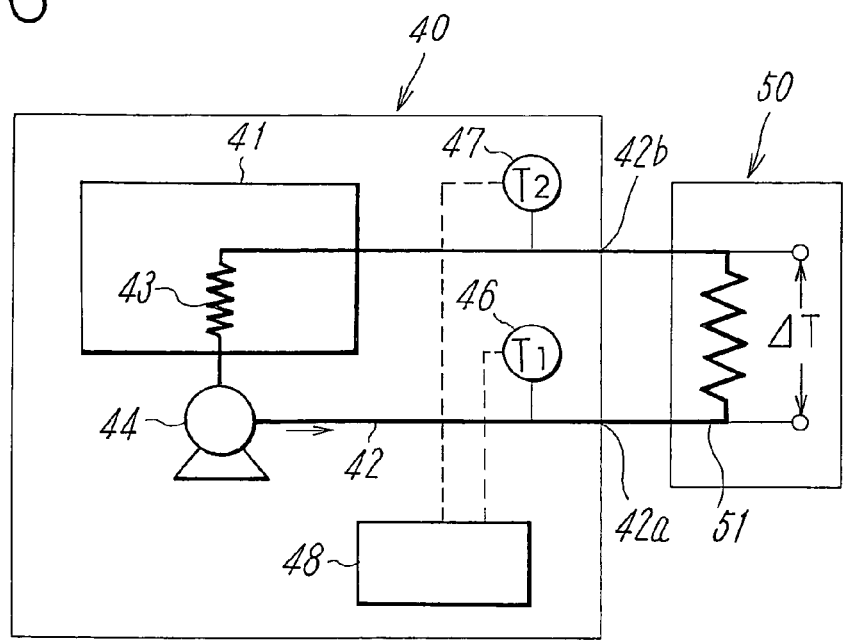
FIG. 6 is a block diagram of a constant temperature liquid circulating device in the related art.

Referring now to FIG. 5, a third embodiment of the present invention will be described.

A constant temperature liquid circulating device 6 in the third embodiment includes an electric proportional valve 35 at the discharge port 12a of the conduit 12 of the constant temperature liquid circulating device 6 for controlling the flow amount of the circulating liquid flowing in the piping 3 of the external device 2 instead of the bypass flow channel 31 and the electric valve 32 in the second embodiment, and the electric proportional valve 35 is controlled by the controller 18 on the basis of the outputs from the temperature sensors 16, 17 to control the flow amount of the liquid flowing in the piping 3 of the external device 2, so that when the heat load in the external device 2 is increased, the electric proportional valve 24 is opened according to the heat load to increase the flow amount to the heat load portion 3a.

The temperature sensors 16, 17 in the third embodiment can be provided on the downstream side of the electric proportional valve 35 before reaching the heat exchanger 13 in the constant temperature liquid circulating device 6.

Since other configurations and effects in the third embodiment are substantially the same as those in the first embodiment, the same or the corresponding portion in the drawing are designated by the same reference numerals and description thereof are omitted.

The invention claimed is:

1. A constant temperature liquid circulating device having a conduit for delivering circulating liquid temperature-controlled at a constant temperature due to a heat exchanger by a pump and a circulating flow channel for allowing the circulating liquid to circulate therein, the circulating flow channel formed by respectively connecting a discharge port and a return port of the conduit to both ends of a piping that defines a flow channel of the circulating liquid in the external device whose temperature is controlled by the circulating liquid, the liquid circulating device comprising:
   a flow amount sensor provided in the conduit;
   temperature sensors for detecting a discharge temperature ($T_1$) of the circulating liquid from the conduit and a return temperature ($T_2$) of the circulating liquid returned to the conduit; and
   a controller configured to control the flow amount and the temperature of the circulating liquid according to a heat load of the external device obtained on the basis of the outputs from the sensors the controller configured to calculate a heat load of the external device from a difference between discharge and return temperatures ($T_1$, $T_2$) of circulating liquid detected by the temperature sensor and a flow amount of circulating liquid detected by the flow amount sensor, to perform only temperature control of circulating water at the heat exchanger while keeping the flow amount of circulating water constant when the heat load is smaller than a preset value, and to perform control to increase the flow amount or the pressure of the circulating water flowing through the piping of the external device besides the temperature control of circulating water by the heat exchanger when the heat load of the external device becomes greater than the preset value, thereby reducing the temperature difference and maintaining the discharge temperature ($T_1$) or return temperature ($T_2$) at the preset temperature.

2. The constant temperature liquid circulating device according to claim 1, wherein the controlling function to control the flow amount or the pressure of the circulating liquid by the controller is a function to control the number of rotations of a pump by an inverter and control the circulating liquid to be delivered to the circulating flow channel.

3. The constant temperature liquid circulating device according to claim 1, comprising:
   a bypass flow channel provided for communicating the discharge port and the return port of the conduit; and
   an electric valve provided in the bypass flow channel for adjusting the flow amount of the liquid flowing therein, thereby controlling the flow amount of the circulating liquid flowing in a heat load portion in the piping of the external device, characterized in that a controlling function of the controller to control the flow amount or the pressure of the circulating liquid is a function to control the liquid flowing in the bypass flow channel by controlling the electric valve.

4. The constant temperature liquid circulating device according to claim 3, wherein the electric valve is an electric three-direction valve provided at a branch point between a piping extending to the heat load portion of the external device and the bypass flow channel at a discharge port of a conduit of the constant temperature liquid circulating device.

5. The constant temperature liquid circulating device according to claim 1, comprising:
   an electric proportional valve at the discharge port of the conduit in the constant temperature liquid circulating device for controlling the flow amount of the circulating liquid flowing therethrough into the piping of the external device,
   wherein a controlling function of the controller to control the flow amount or the pressure of the circulating liquid is a function to control the liquid flowing in the piping of the external device by controlling the electric proportional valve.

6. A method of controlling the temperature in a constant temperature liquid circulating device having a conduit for delivering circulating liquid temperature-controlled at a constant temperature due to a heat exchanger by a pump, a circulating flow channel for allowing the circulating liquid to circulate therein, the circulating flow channel formed by respectively connecting a discharge port and a return port of the conduit to both ends of a piping that defines a flow channel of the circulating liquid in the external device whose temperature is controlled by the circulating liquid, and a flow amount sensor provided in the conduit and temperature sensors for detecting a discharge temperature ($T_1$) of the circulating liquid from the conduit and a return temperature ($T_2$) of the circulating liquid returned to the conduit, the method comprising:

calculating a heat load of the external device from the temperature difference between the discharge and return temperatures ($T_1$, $T_2$) of the circulating liquid detected by the both temperature sensors and the flow amount of circulating liquid detected by the flow amount sensor;

controlling the temperature of the circulating liquid by means of the heat exchanger while maintaining the flow amount of circulating water constant when the heat load is smaller than a certain preset value; and increasing the flow amount or the pressure of the circulating liquid flowing toward a heat load portion in the piping of the external device and controlling simultaneously the temperature of the circulating liquid by means of the heat exchanger when the heat load is larger than the certain preset value, whereby the discharge temperature ($T_1$) or the return temperature ($T_2$) is maintained at the preset temperature by reducing the difference of temperature.

* * * * *